United States Patent [19]

Kirchhoff et al.

[11] 4,424,695
[45] Jan. 10, 1984

[54] ARRANGEMENT FOR FABRICATING DOUBLE CONICAL SPRINGS

[75] Inventors: Ernst Kirchhoff, Hagen; Alfred Ränder, Iserlohn; Günter Adolf, Hagen, all of Fed. Rep. of Germany

[73] Assignee: Estel Hoesch Werke Aktiengesellschaft, Dortmund, Fed. Rep. of Germany

[21] Appl. No.: 205,950

[22] Filed: Nov. 12, 1980

[30] Foreign Application Priority Data

Jun. 3, 1980 [DE] Fed. Rep. of Germany ....... 3020958

[51] Int. Cl.³ .......................... B21F 3/10; B21F 35/02
[52] U.S. Cl. ....................................... 72/128; 72/137; 72/139
[58] Field of Search ................. 72/137, 138, 139, 142, 72/128; 29/173; 140/89, 103; 267/166, 180

[56] References Cited

U.S. PATENT DOCUMENTS

| | | | |
|---|---|---|---|
| 16,483 | 1/1857 | Harrison | 72/139 |
| 603,175 | 4/1898 | Collins | 72/139 X |
| 964,701 | 7/1910 | Scott | 29/173 |
| 2,335,423 | 11/1943 | Knoop | 72/139 |
| 2,456,755 | 12/1948 | Terrell | 72/139 |
| 2,922,220 | 1/1960 | Sacchini | 29/173 |
| 3,906,766 | 9/1975 | Sato | 72/138 X |

FOREIGN PATENT DOCUMENTS 2330208 1/1975 Fed. Rep. of Germany ........ 29/173

*Primary Examiner*—E. Michael Combs
*Attorney, Agent, or Firm*—Max Fogiel

[57] ABSTRACT

An arrangement for producing double conical springs from heated rod-shaped material, in which one side of a conical-shaped spring is formed with a cylindrical end corresponding to the largest winding diameter. The end is then shaped to a conical form. After being transferred from a spring winding station to an end roll-in unit, the spring is clamped, and a shaping member is inserted radially into the spring, and moved against a stop. With the aid of a roll-in head, the cylindrical spring end is conically formed. After the shaping member is radially removed from the spring, the latter is released and transported to a hardening process.

11 Claims, 5 Drawing Figures

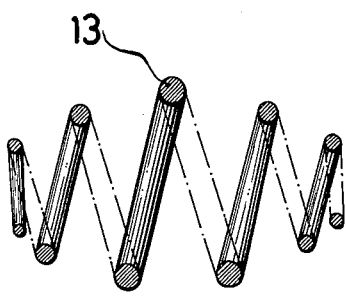
FIG. 2
FIG. 3
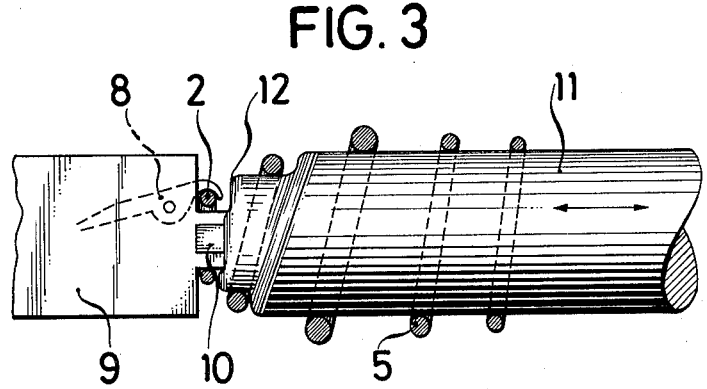

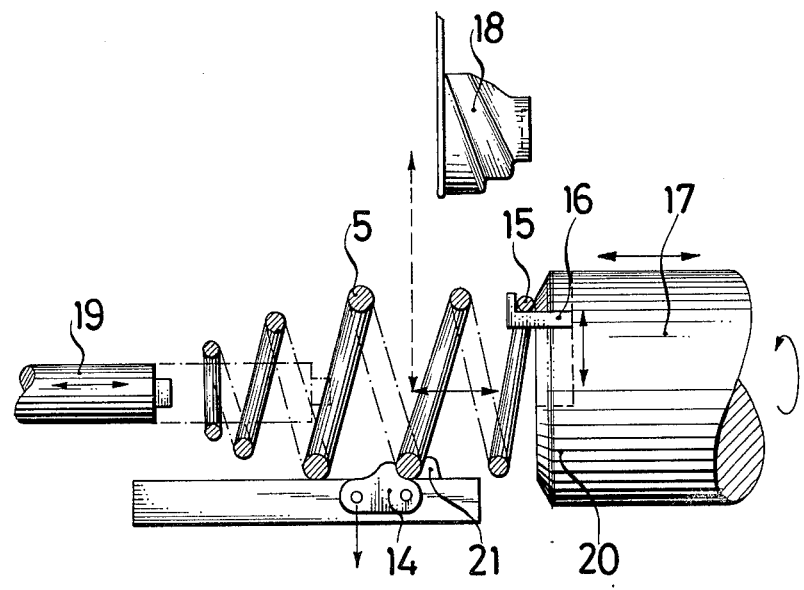
FIG.4
FIG.5
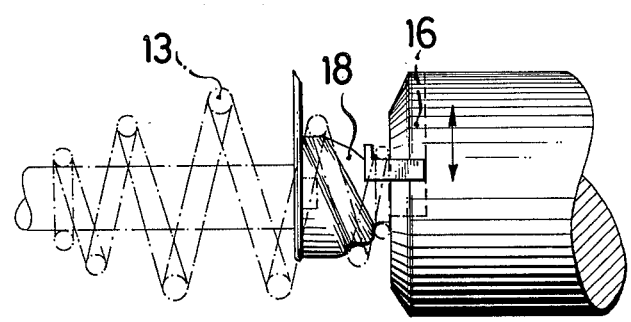

ARRANGEMENT FOR FABRICATING DOUBLE CONICAL SPRINGS

BACKGROUND OF THE INVENTION

The present invention relates to a method and apparatus for producing double conically-shaped springs or the like from heated rods. The shaping of the article is produced in several steps, and apparatus is provided for carrying out the method.

There is described in the German patent reference DE-OS 23 30 208, a method for producing an article of the foregoing species for taking advantage of hot-forming in relation to the known cold-forming of the article. In this arrangement, the spring is first wound on a mandrel corresponding to the smallest internal diameter of the spring. The spring is thus wound in a cylindrical manner. Thereafter, in a second step, the windings are brought to a larger diameter by winding back, on a hollow form.

Such a process cannot be carried out on conventional winding apparatus for machines, and leads to particular difficulties when extremely small spring diameters are used at the spring ends. Difficulties are also incurred in the shaping procedure, whereby the springs may be additionally damaged. There is also required a relatively large and complex amount of equipment, as well as fabrication time.

Accordingly, it is an object of the present invention to provide a method and apparatus through which any winding diameter can be produced and conventional manufacturing elements can be used for the fabrication processes.

Another object of the present invention is to provide an arrangement of the foregoing character which is substantially simple in construction and may be economically assembled.

A further object of the present invention is to provide an arrangement, as described, which may be easily maintained in service and which has a substantially long operating life.

SUMMARY OF THE INVENTION

The objects of the present invention are achieved by providing a method in which one side of a conically-shaped spring is produced with a cylindrical end which corresponds to the largest diameter of the spring winding. The spring windings connected to this end are then conically shaped.

In a further embodiment of the present invention, the conical shaping is produced advantageously by rolling-in the spring end in a forced manner.

The heat required for finally tempering the spring may also be used advantageously in the shaping process.

After transfer of the spring from a winding machine station, the spring is clamped on a unit for rolling-in the spring end. A shaping member is radially introduced in the spring and brought axially against an abutment or stop. The other cylindrical end is then conically shaped with the aid of a roll-in head. After removal radially of the shaping member, the spring is released and transported further for hardening.

The present invention has an essential characteristic that it is comprised essentially of a slidable clamping arrangement, a shaping member, and a roll-in head with a clamping element.

In accordance with the present invention, the shaping of the spring is carried out in a substantially simple manner, whereby the clamping element is moved out of its initial position at the largest spring diameter during the turning of the required angle radially towards the interior.

The forced guidance during the conical shaping of the spring is carried out, so that the outer profile of the shaping member corresponds to the internal profile of the original cylindrical end of the spring. The outer diameter of the clamping element corresponds also to the internal diameter of the original cylindrical spring end.

It is also advantageous, in some cases, when the shaping member is rotatable about its longitudinal axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a sectional view of a double conical spring;

FIG. 3 is a partial sectional view of a winding station for producing one side of a conically-shaped spring;

FIG. 4 shows the arrangement for rolling-in an end of a spring prior to the beginning of the rolling-in process; and FIG. 5 shows the arrangement of FIG. 4 after rolling-in through an angle of 360°.

DESCRIPTION OF THE PREFERRED EMBODIMENTS

Figure 1:
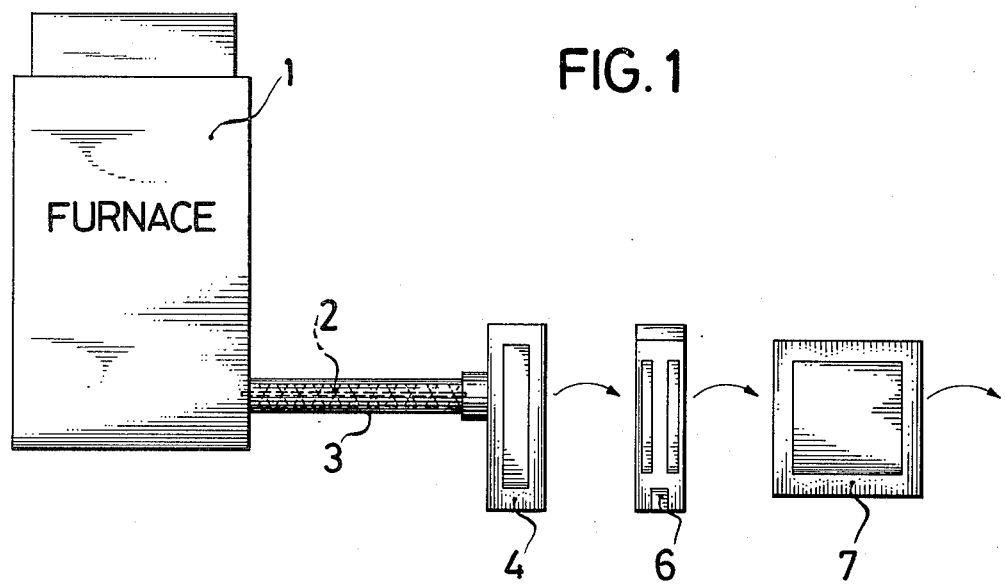
FIG. 1 is a schematic view and shows the arrangement for a hot-winding process, in accordance with the present invention.

In accordance with FIG. 1, a rod 2 heated in the furnace 1 is transported to a winding station 4 by a conveyor path 3.

After producing the first spring form 5 (FIG. 3) the finishing operation takes place on the end rolling-in unit 6 (FIG. 4 and 5). Thereafter, the spring is transferred to the hardening machine 7.

In accordance with FIG. 3, the entering rod 2 on the winding station 4 is clamped by a clamping lever 8 on the holding unit 9.

The holding unit 9 is connected to the winding mandrel 11 by a coupling 10. The mandrel has at its front end a winding step-shaped turned section 12. The latter is fitted to the internal shape of the left side of the double conical spring 13 shown in FIG. 2.

By turning the winding mandrel and holding unit, one side of the conical spring shape 5 is formed from the rod 2 with the aid of an exterior guidance arrangement (not shown).

After side-wise removal of the winding mandrel 11 and unlocking of the clamping lever 8, the pre-shaped spring 5 is removed and introduced into the end rolling-in apparatus 6 (FIG. 4).

After positioning of the spring shape 5, the latter is clamped with a clamping arrangement 14. The spring end 15 is gripped by a clamping element 16 of the roll-in head 17. A shaping member 18 is inserted radially through the spring windings into the interior of the spring form 5, and pushed axially against the roll-in head 17, where it is held in position by a holding mandrel 19.

Thereafter, during rotation of the roll-in head 17 about the required angle, the clamping element 16 in a guidance slot or notch 20, becomes pushed out of its initial position at the outer diameter of the spring form 5 radially towards the interior, in a manner that is not further described.

As a result, the original cylindrical spring end becomes deformed by the fastening unit 21 in the clamping arrangement 14. The process is carried out with the desired number of winding turns and forcefully guided on the shaping member 18 where it is rolled on (FIG. 5), so that the double conical spring 13 results.

The shape of such a spring can be varied widely by corresponding variations in the tool elements, and it can also be provided, for example, with a middle cylindrical portion.

Since the end roll-in arrangement of the present invention can be used also as a positioning unit, it is not necessary to substantially change the fabrication elements when changing from, for example, cylindrical springs to double conical springs.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for producing double conical springs having a largest winding diameter located between ends of the springs, comprising the steps of: heating wire-shaped material; winding said wire-shaped material on a mandrel having a cylindrical portion and a conical end, so that gaps of space are left between wound coils; removing said mandrel to leave a semi-finished spring having a cylindrically wound portion joined to a first conically wound end portion, said semi-finished spring having an interior profile corresponding substantially to the outer profile of said mandrel; clamping one end of said cylindrically wound portion to a roll-in unit; clamping and holding a coil of said semi-finished spring which is to remain cylindrical in the double conical spring when finished, the cylindrical portion of said semi-finished spring between said clamped one end and said cylindrical coil being formed to a second conically wound portion by said roll-in unit; inserting a shaping member radially into the interior space of said cylindrically wound portion by passing said shaping member through at least one gap between coils and moving said shaping member axially against said roll-in unit; holding said shaping member stationary against said roll-in unit; rotating said roll-in unit through a predetermined angle and moving said one end clamped to said roll-in unit inwardly toward the interior of said cylindrically wound portion so that said cylindrically wound portion is wound onto said shaping member for deforming said cylindrically wound portion into said second conically wound portion, said cylindrical coil being located between said first conically wound portion and said second conically wound portion; and removing said shaping member from the interior of said second conically wound portion by passing said shaping member through at least one gap between coils to the exterior of the spring.

2. A method as defined in claim 1, wherein only the portion of said semi-finished spring between said one end clamped to said roll-in unit and the clamped cylindrical coil is deformed by rotation of said roll-in unit to form said second conically wound portion, said double conical spring being provided for motor vehicle chassis.

3. A method as defined in claim 1 and moving a holding mandrel axially through interior of said semi-finished spring toward said shaping member to hold said shaping member against said roll-in unit, said holding mandrel being removed from the interior of the spring after said second conically wound portion has been formed.

4. A method as defined in claim 1, and locating said holding mandrel, roll-in unit, shaping member and spring on a common axis when forming said second conically wound portion.

5. A method as defined in claim 1, and moving said shaping member axially away from said roll-in unit before passing said shaping member through at least one gap between spring coils, after said second conically wound portion has been completed.

6. A method as defined in claim 1, and quenching the spring after forming said second conically wound portion, only a single initial heating step being used in the formation of the double conical spring.

7. A method as defined in claim 1, and varying the pitch between coils and wire diameter over length of the spring.

8. Apparatus for producing double conical springs having a largest winding diameter located between ends of the springs, comprising: means for heating wire-shaped material; means for winding said wire-shaped material on a mandrel having a cylindrical portion and a conical end, so that gaps of space are left between wound coils; means for removing said mandrel to leave a semi-finished spring having a cylindrically wound portion joined to a first conically wound end portion, said semi-finished spring having an interior profile corresponding substantially to the outer profile of said mandrel; means for clamping one end of said cylindrically wound portion to a roll-in unit; means for clamping and holding a coil of said semi-finished spring which is to remain cylindrical in the double conical spring when finished, the cylindrical portion of said semi-finished spring between said clamped one end and said cylindrical coil being formed to a second conically wound portion by said roll-in unit; means for inserting a shaping member radially into the interior space of said cylindrically wound portion by passing said shaping member through at least one gap between coils and moving said shaping member axially against said roll-in unit; means for holding said shaping member stationary against said roll-in unit; means for rotating said roll-in unit through a predetermined angle and moving said one end clamped to said roll-in unit inwardly toward the interior of said cylindrically wound portion so that said cylindrically wound portion is wound onto said shaping member for deforming said cylindrically wound portion into said second conically wound portion, said cylindrical coil being located between said first conically wound portion and said second conically wound portion; and means for removing said shaping member from the interior of said second conically wound portion by passing said shaping member through at least one gap between coils to the exterior of the spring.

9. Apparatus as defined in claim 8 and including a holding mandrel axially movable through the interior of said semi-finished spring toward said shaping member to hold said shaping member against said roll-in unit, said holding mandrel being removed from the interior of the spring after formation of said second conically wound portion.

10. Apparatus as defined in claim 8, wherein only the portion of said semi-finished spring between said one end clamped to said roll-in unit and said clamped cylindrical coil is deformed by rotation of said roll-in unit for forming said second conically wound portion, said double conical spring being provided for motor vehicle chassis.

11. Apparatus as defined in claim 9 wherein said holding mandrel, roll-in unit, shaping member and spring have a common axis during formation of said second conically wound portion.

* * * * *